June 19, 1956  R. L. HASCHE  2,751,424
PROCESS OF PRODUCING ACETYLENE BY PYROLYTIC
REACTION FROM A SUITABLE HYDROCARBON
Filed Sept. 22, 1950  2 Sheets-Sheet 1
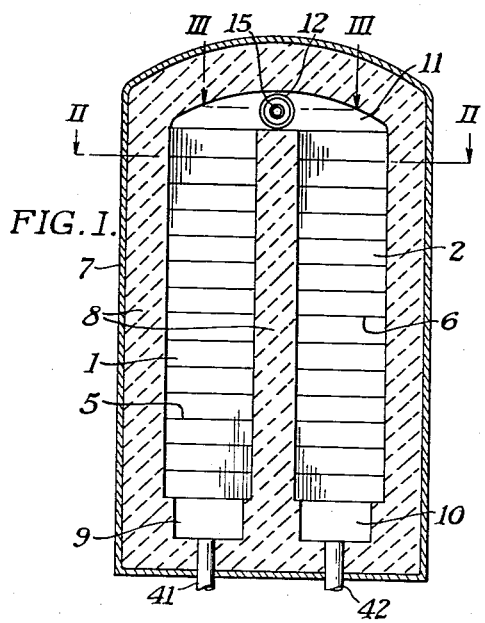
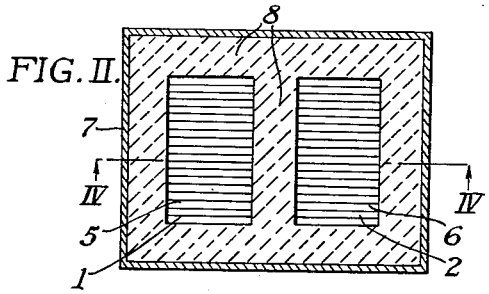
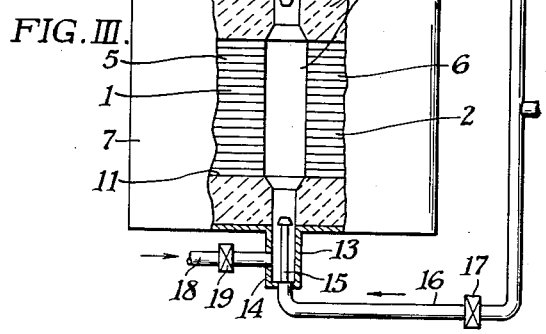
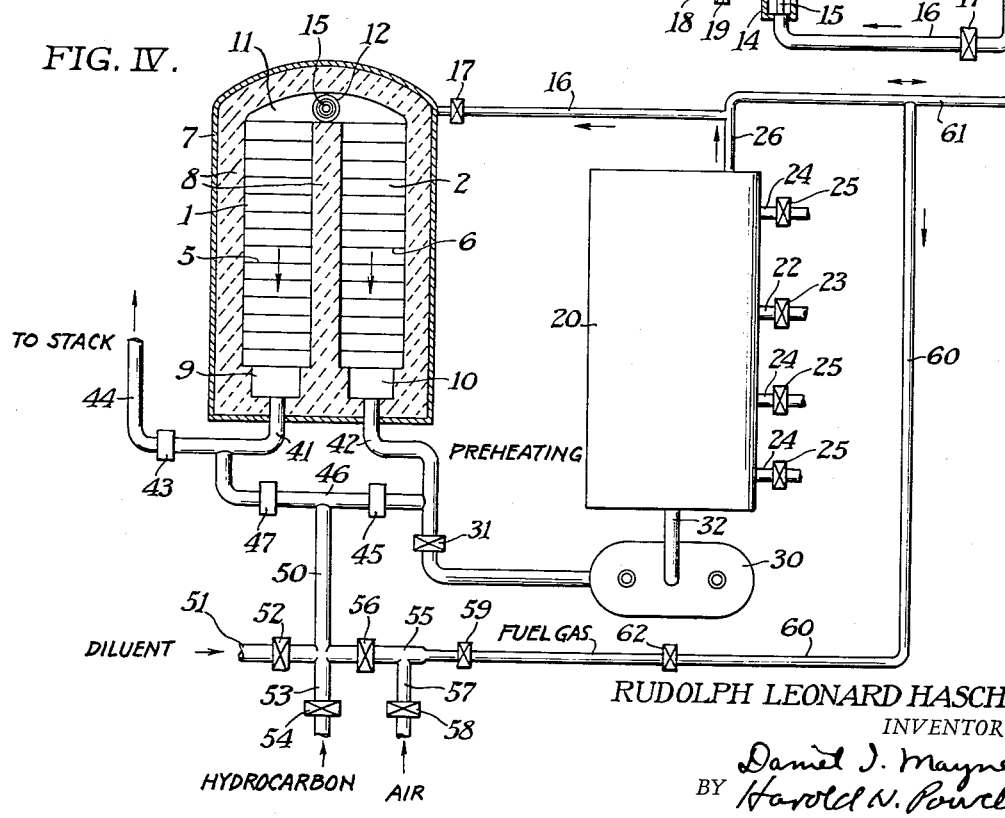
RUDOLPH LEONARD HASCHE
INVENTOR
BY Daniel J. Mayne
Harold N. Powell
ATTORNEYS

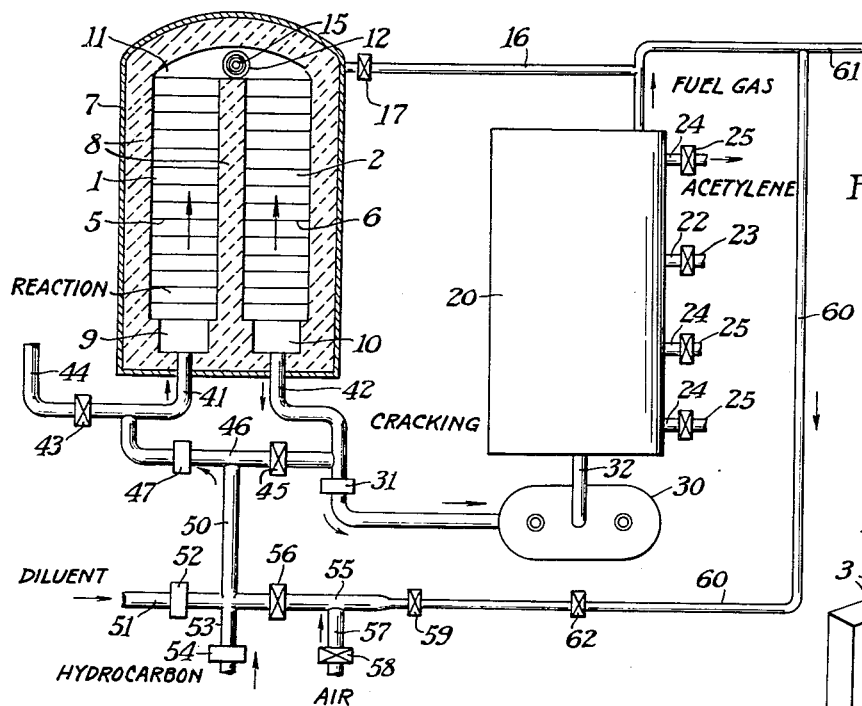
FIG. V.
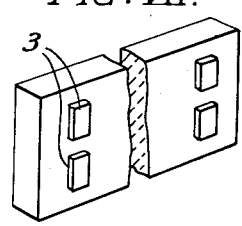
FIG. VII.
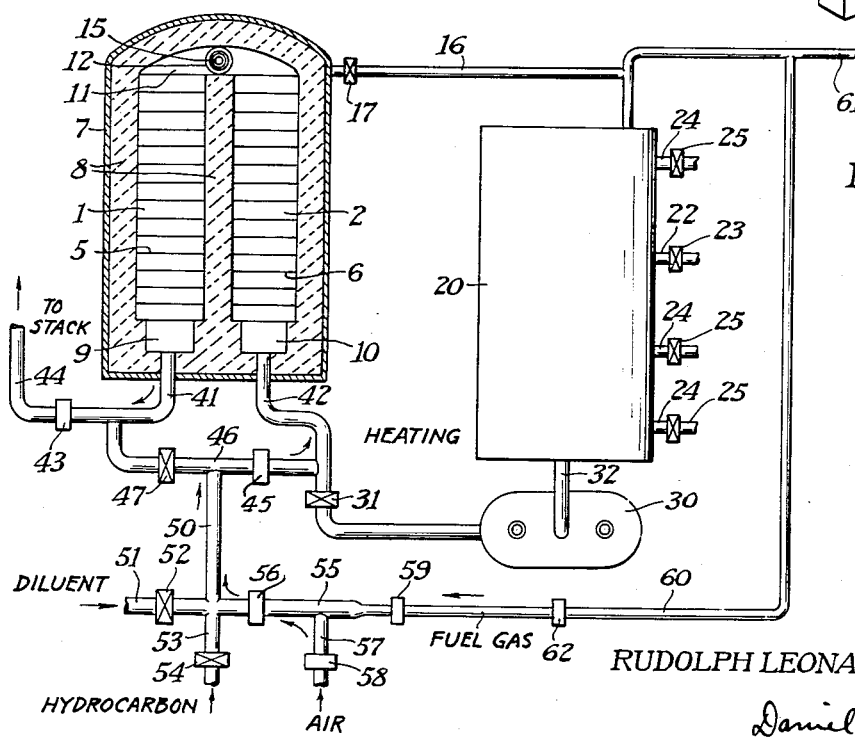
FIG. VI.
RUDOLPH LEONARD HASCHE
INVENTOR — # United States Patent Office 2,751,424
Patented June 19, 1956

2,751,424

PROCESS OF PRODUCING ACETYLENE BY PYROLYTIC REACTION FROM A SUITABLE HYDROCARBON

Rudolph Leonard Hasche, Johnson City, Tenn., assignor, by mesne assignments, to Koppers Company, Inc., Pittsburgh, Pa., a corporation of Delaware Application September 22, 1950, Serial No. 186,228

6 Claims. (Cl. 260—679)

My invention relates to the production of an off-gas containing a substantial proportion of acetylene from an in-gas containing a substantial proportion of any acetylene forming hydrocarbon, the acetylene being produced by heating the in-gas to a reaction temperature at which a portion of the hydrocarbon is converted to acetylene by an endothermic reaction and thereafter continuing the reaction by adding the heat units, necessary to said reaction, to the in-gas.

Certain words and phrases are used by me in this specification, and in the claims subjoined thereto, in accordance with the following definitions:

"In-gas" is defined as any acetylene forming hydrocarbon, or mixture of gases containing a substantial amount of any acetylene forming hydrocarbon, which is to be subjected to any process which embodies the invention or inventions hereinafter claimed;

"Off-gas" is defined as the gas which has been subjected to that process and which contains the acetylene formed in the process;

"Reaction" is defined as, and limited to, an endothermic reaction which is produced by adding sufficient heat to the in-gas to cause a portion of the acetylene forming hydrocarbon carried in the in-gas to be converted to acetylene which is carried in the off-gas;

"Reaction temperature" is defined as, and limited to, temperatures at or above which the above-defined reaction will occur;

"Acetylene forming hydrocarbon" is defined as any hydrocarbon having a boiling point below 250° F. at atmospheric pressure and which is now known in the art as capable of forming acetylene when subjected to heat. Methane, ethane, propane, and butane are such acetylene forming hydrocarbons and are preferred due to availability and low cost. Acetylene forming hydrocarbons are not always available in pure form and any mixture of hydrocarbon gases which contains substantial amounts of acetylene forming hydrocarbons may be used. Other commercial materials suitable for use in my process are mixtures containing saturated hydrocarbons; for example, materials such as natural gas, natural gasoline, and gas oil.

"Operative proportion," when used to indicate the proportion of a particular gas in any gas mixture, is defined as, and limited to, a proportion of two per cent (2%) or more by volume of the particular gas in one hundred per cent (100%) of total gas mixture. A process using a smaller proportion of such a gas would be without utility due to operational difficulties and low yields.

"Diluent" is defined as, and limited to, any gas other than the acetylene forming hydrocarbon which is contained in the in-gas. Gases which are not themselves changed by the process, such as nitrogen and hydrogen, and gases which may be changed during the process, such as superheated steam, may be included in the term "diluent."

If the in-gas, before being subjected to the process, is at atmospheric temperature or any temperature below reaction temperature, the heat needed to raise the in-gas to reaction temperature is defined as "sensible heat." The heat absorbed by the endothermic reaction is defined as "reaction heat." The sensible heat applied to the in-gas remains as sensible heat in the off-gas but the necessary reaction heat is absorbed from the regenerative masses provided in my furnace and the major part of it is latent in the acetylene of the off-gas which is an endothermic product.

It is an object of my invention to provide a process in which the major portion of the contributed sensible heat supplied to the in-gas is derived from recovered sensible heat taken from the off-gas and stored in a regenerative mass. In my process the contributed sensible heat may be about equal to reaction heat carried away in the acetylene so that a substantial heat economy is effected by the recovery and reuse of sensible heat.

It is a further object of my invention to supply all of the reaction heat, and such sensible heat as is not recovered and reused, by the combustion of a fuel gas, preferably the fuel gas which, in my process, remains after the acetylene is removed from the off-gas.

It is a further object of my invention to always cool the off-gas to a temperature substantially below reaction temperature before all the acetylene forming hydrocarbons which might otherwise be converted into acetylene, and which are carried in the off-gas, are so converted.

In my process, due to the novel methods of operation, while the formation of acetylene does not start until the in-gas is raised to reaction temperature, this reaction continues as the off-gas is cooled provided there is a surplus of convertible acetylene forming hydrocarbon in the off-gas when the cooling is complete. In other words, the rate of formation of acetylene in the gas falls off gradually as the cooling proceeds.

Unfortunately, although the endothermic reaction is very fast, it still requires some time. My investigations indicate that this reaction occurs much faster than had previously been considered possible and that under controlled conditions almost all the convertible hydrocarbon can be converted to acetylene if the gas is held at reaction temperature for a period as short as three one-hundredths ($3/100$) of a second.

It is further an object of my invention to provide a process in which such exothermic reactions are prevented by holding the gas at or above reaction temperature for a period of less than three one-hundredths ($3/100$) of a second.

The words "up" and "down" or "right" and "left," or other words used hereinafter as an aid to clarity of description, are used to denote position of parts or direction of movement as seen on the drawings and should not be construed in any other sense, and particularly should not be construed as limiting the scope of my invention.

The drawings illustrate a convenient apparatus in which my process may be conducted. In the drawings:

Fig. I is a vertical section through the center of a furnace, adapted for use in my process, on a plane vertical to the paper indicated by the line IV—IV in Fig. II, this plane being viewed in the direction of the arrows adjacent that line;

Fig. II is a section on a plane vertical to the plane of the paper and indicated by the broken line II—II of Fig. I, this plane being viewed in the direction of arrows adjacent the ends of the line II—II in Fig. I;

Fig. III is a plan view as viewed in the direction of the arrows in Fig. I with a portion of the furnace shown in section on a bent plane as indicated by the line III—III of Fig. I;

Fig. IV is a view showing rather schematically the apparatus used to practice my process during a preheating step as further described herein. In this figure, and Figs.

V and VI, closed valves are indicated by crossed lines inside the rectangle used to indicate a valve;

Fig. V is a view similar to Fig. IV showing the apparatus as used to conduct the cracking step;

Fig. VI is a view similar to Figs. IV and V showing the apparatus as used to conduct the heating step; and Fig. VII is an isometric view of a brick or tile which may be used to construct the regenerative masses as hereinafter explained.

In practicing the invention claimed herein I may use the novel form of furnace invented by me shown and described herein but not claimed herein. The process disclosed and claimed herein may be practiced in other forms of furnace and the furnace disclosed herein may be used to practice processes other than those claimed herein.

The furnace as shown in Figs. I, II and III consists of a first regenerative mass 1 and a second regenerative mass 2. For convenience, the masses are shown as identical in size, shape and general construction, but, since they perform different functions, they need not be identical. Each mass is constructed of a material which is highly refractory to heat and preferably has a high heat conductivity. Silicon carbide, commonly known and herein referred to as Carborundum is an excellent material for the purpose. Carborundum has a high heat conductivity and can withstand temperatures as high as 3000° F. without much deterioration. My process might operate better at higher temperatures than 3000° F., but the characteristics of the available refractories are a limiting factor. Should high heat conductive refractory materials which will withstand temperatures above 3000° F. ever become available for use, higher temperatures should be used.

The masses may be constructed of silicon carbide bricks or tiles such as those shown in Fig. VII, the bricks having protuberances 3 on the side thereof. The bricks should be laid so as to form parallel, vertical, single brick walls, each wall separated from its neighboring wall by a thin space or slot having a thickness equal to the depth of the protuberances 3. These slots extend vertically through each mass to form gas passages or slots through the masses and are shown in the drawings as thin lines extending in the direction of the line IV—IV in Fig. II. Since these passages may be only ⅛ inch wide, it is impractical to show them otherwise on a small drawing.

The slots 5 in the first regenerative mass 1 are hereinafter referred to as first slots and those in the second mass 2 are referred to as second slots 6. In the drawings, the slots extend from right to left across each of the masses but the word "slot" is used generically hereinafter to denote a hole of any shape extending through a regenerative mass. The slots in each mass should, however, preferably have, when Carborundum is used, a collective area in a horizontal plane, as seen in Fig. I and indicated by the line II—II, of from 10% to 30% of the total area of the mass in this plane. The masses are carried inside a tight steel shell 7 lined with heat refractory material 8 which forms a central wall extending from the bottom of the furnace up to a central cross-over and fire box space 11 as shown in Fig. I. The furnace is so constructed that it has a right-hand or first lower space 9, a left-hand or second lower space 10 and the upper or cross-over space 11 through which gas may pass after leaving the top of the slots 5 or 6 in one of the masses to the top of the slots in the other mass.

For the purpose of initially so heating the masses 1 and 2 that the process can be started or restarted and continued with a proper balance and location of heat in the masses, I provide burners 12 and 13, as best shown in Fig. III. Each of the burners comprises an outer shell 14 inside which is a nozzle 15. Fuel, or fuel gas, is supplied to each nozzle 15 through a fuel pipe 16 having a burner fuel valve 17, and air under pressure is supplied through an air pipe 18 having a burner air valve 19. Since the burners 12 and 13 are used infrequently, the valves 17 and 19 may be manually controlled. The burners 12 and 14 deliver hot products of combustion to the upper space 11.

When used to practice my process, the furnace above-described converts an in-gas to an off-gas containing a substantial proportion of acetylene and, for the purpose of separating the acetylene from the off-gas, a separator 20 must be supplied, as shown in Figs. IV, V and VI. This separator is shown by a rectangle to indicate that any sort of separation apparatus may be used. In actual use this separator may consist of a power-driven compressor, absorption towers and auxiliary apparatus, not shown since various forms and assemblies of apparatus are well known and available for use and the particular form of separator used is immaterial. It should be sufficient to say that the separator 20 as shown in Figs. IV, V and VI receives an off-gas, containing acetylene, through a pipe 42 and separates therefrom the acetylene which is delivered through an acetylene pipe 22, having an acetylene valve 23, to storage or point of use. It may also separate other gases or liquids which are delivered to waste or use through pipes 24 having valves 25.

After such separation, the residuum from such separation is delivered as an off-fuel-gas through the pipe 26. This gas is usually predominately hydrogen plus hydrocarbons and other gases and it has a good fuel value. In practice some of it is used as fuel in the process as will be further explained hereinafter. I prefer to pull the off-gas from the furnace at a pressure substantially below atmospheric pressure and perhaps at an absolute pressure as low as 100 mm. of mercury and for this purpose I prefer to use a power driven exhauster or vacuum pump 30 which takes off-gas from the furnace through a valve 31 in a pipe 42 and delivers this gas to the separator through the pipe 32. The piping and valves needed to provide convenient operation of my process can be best understood from a study of Fig. IV.

The furnace is provided with a first lower outlet pipe 41 for taking or delivering gas from the first lower space 9, and with a second lower outlet pipe 42 for taking or delivering gas to the second lower space 10. The first lower outlet pipe 41 can deliver gas through a stack valve 43 to the stack pipe 44 through which spent products of combustion can be delivered to the atmosphere. The valves 52, 56, 54 and 31, being closed, gas can also be delivered from the second lower space 10 through the pipe 42 to the pipe 41 by opening the valves 45 and 47. The second lower outlet pipe 42 can also deliver the off-gas through the valve 31 to the exhauster 30. A pipe 46 can deliver or receive gas from the pipe 42 through a valve 45 or deliver or receive gas from the pipe 41 through a valve 47. Either a combustible mixture or the in-gas is delivered upwardly through a pipe 50 to the pipe 46.

Starting with a cold furnace or with a furnace which is still hot but in which the masses 1 and 2 are not properly heated, a preheating step is necessary to properly condition the furnace for the operation of the process. Assuming that all other valves are closed as shown in Fig. IV which illustrates conditions during the preheating step, the valves 17 are opened to deliver fuel gas to the burners 12 and 13 and the valves 19 are opened to deliver air to the burners. The valve 43 is opened and cooled combustion gases leaving the bottom of the first slots 5 are taken from the first lower space 9 and through the valve 43 to the stack pipe 44. Valves 45 and 47 also being open, gas is delivered through the pipe 42, the valves 45 and 47 to the pipe 41, and thence through the valve 43 to the pipe 44. The preheating step is continued until the upper portion and preferably more than the upper half of both the first mass 1 and the second mass 2 are heated about as hot as the Carborundum will stand, or to nearly 3,000° F. The valves 17 and 19 are then closed, thus stopping combustion at the burner 12 and the valves 43 and 45 are then closed, shutting off the flow of gas to the stack pipe 44. This completes the preheating step which ordinarily will be repeated only after the furnace has been shut down for at least several hours or because in cyclic operation the heat has become improperly distributed in the masses 1 and 2. As soon as the preheating is completed, cyclic or productive operation of the furnace is started, the cycle consisting of a cracking and a heating step which will now be described.

Conditions that persist during the cracking step are illustrated in Fig. V. The valves 52 and 54 each are opened to a predetermined degree to deliver an in-gas containing an acetylene forming hydrocarbon to the pipe 50 and this gas flows through the valve 47 into the first lower space 9 and upwardly through the first slots 5 through the upper space 11 and downwardly through the second slots 6 to the second lower space 10. Before the in-gas gets out of the first slots 5 it is raised to the reaction temperature needed to convert the acetylene forming hydrocarbon to acetylene and endothermic reaction starts, the heat of reaction being largely extracted from the upper portion of the first mass. We may assume, for example, that the temperature of the gas must be raised to 2200° F. before the reaction starts and, of course, as long as there are hydrocarbons present in the gas that may be reacted, the temperature of the gas cannot be much over 2200° F. as all the heat that can be extracted from the first mass 1 is absorbed by the reaction. It is an essential feature of my invention that the gas shall be cooled substantially below reaction temperature before all the reactable hydrocarbons in the off-gas are reacted. This necessitates subjecting the gas to reaction temperature for less than three one-hundredths ($3/100$) of a second. Previous inventors have suggested a reaction period of one-tenth ($1/10$) of a second or longer but I have found that this time should be much shorter than is taught by the art.

During the cracking step the in-gas may enter the bottom of the slots 5 at atmospheric temperature and the lower portion of the first mass 1 is cooled by this upward flow of cool gas. The in-gas is heated to reaction temperature in the slots 5 and the upper portion of the mass which supplies reaction heat is cooled toward reaction temperature so that the net effect of the cooling step on the first mass is to cool it by extracting both sensible and reaction heat therefrom. The gas entering the slots 6 of the second mass is at about reaction temperature but the lower portion of the second mass 2 is below this temperature. The gas, as it passed downwardly through the slots 6, is progressively cooled and may emerge from the slots 6 into the lower space 10 at as low a temperature as 250° F. The difference between the top and bottom temperature of the two masses is increased as the masses are made longer in the direction of gas flow, but usually a mass 15 feet or less in height will give excellent results. The top of the second mass 2 will be very close to the reaction temperature at the conclusion of the cracking step and the temperature of the down flowing gas may be very little reduced until after the gas is half way down through the slots 6. Although the top of the second mass 2 at the start of the cracking step may be at about cracking temperature, this temperature is progressively reduced toward the bottom of the mass which in cyclic operation may, at the start of the cracking operation, be below 250° F. The temperature of the lower portion of the second mass 2 is increased at it absorbs heat from the gas flowing downwardly through the second mass.

The cracking step should be stopped before the top of the first mass 1 is cooled to a temperature so low that the reaction becomes too slow, or whenever the bottom of the mass 2 reaches too high a temperature, whichever condition first occurs. Whenever the differential between the temperature of the top of the first mass and the temperature of reaction has been reduced to not more than 50% of its initial value, the cracking step should be stopped or it should be stopped before the temperature of the gas entering the lower space 9 from the bottom of the slots 5 rises to say 500° F. In a well designed plant the temperature of the gas in the space 10 is controlling. That is, if the cracking step is stopped whenever the temperature of the off-gas rises to 400° F., the reaction in the slots 5 will still be proceeding. Of course, the process will still be operative and acetylene will be produced if these limits are ignored as long as the top of the first mass is above reaction temperature and can deliver heat of reaction to the gas, the limit of 500° F. on the off-gas being a convenient indication to the operator that the cracking step should be stopped.

The off-gas from the second lower space 10 passes downwardly through the pipe 42 and the valve 31 to the exhauster 30 and through the pipe 32 to the separator 20, where the acetylene is taken out of the off-gas as previously described. The exhauster is used principally to lower the partial pressure on methane when it is desired to crack methane. It need not necessarily be used even in methane cracking, but it improves the results of the process at the cost of power supplied to the exhauster.

The cracking step must, of course, be stopped before the top of the first mass falls to reaction temperature since the heat of reaction can be delivered only by transfer of heat from the mass to the in-gas.

The cracking step is stopped by closing the valves 47, 52, 54 and 31 and the heating step is started by opening the stack gas valve 43 and opening the valves 62, 56 and 45 as shown in Fig. VI. Fuel gas flows into the mixer 55 from the pipe 60 through the valve 59, the rate of flow being controlled by the valve 59, which may be only partly open or "cracked." The air needed to produce a combustible mixture in the mixer 55 is supplied by opening the valve 58.

The fuel gas may be gas previously delivered to storage through the pipes 26 and 61, this gas containing hydrogen, formed by the reaction to acetylene, and the diluent which may be methane or other hydrocarbon. This gas is returned through the pipe 61 to the pipe 60. The check valve 59 is used to prevent air from the pipe 57 getting back into gas storage through the pipe 60. Enough air is supplied through the valve 58 to make a rather lean mixture of air and fuel in the mixer 55 and this mixture passes through the valves 56 and 45 and the pipe 42 into the second lower space 10. The mixture passes upwardly through the second slots 6 through the space 11 and downwardly through the slots 5 being carried away from the first lower space 9 by the pipe 41 and through the valve 43 to the stack pipe 44. The combustible mixture enters the second lower space 10 at about atmospheric temperature but is gradually heated to slightly above ignition temperature as it moves upwardly in the slots 6, the heat absorbed by said heating being sensible heat stored in the second regenerative mass 2 during the preceding cracking step. The upward velocity of this mixture through the second slots 6 should be sufficient to prevent any downward flame propagation in the second slots 6. Ignition of the hydrogen and methane will start at about 1,000° F.

The gases are heated in their upward passage through the slots 6 until they are ignited in the slots 6 to form products of combustion which give up heat to the masses 1 and 2 and are themselves cooled in their continued travel to the first lower space 9. In a well designed and operated plant these products of combustion may be at a temperature as low as 250° F. when they leave the stack pipe 44. The above-described combustion supplies all the heat, both sensible and reaction, that is used in the process and in a well designed and operated plant the heat economy is so high that substantial amounts of fuel gas are delivered through the pipe 61 for sale or use.

During the heating period, although all of the first mass 1 and the upper portion of the second mass 2 are heated, the lower portion of the second mass is cooled by the extraction of heat from the mass by the upward passage of the combustible mixture through the slots 6.

Enough sensible heat must, of course, be supplied to bring the combustible mixture of gas up to ignition temperature. It is generally desirable near the end of the heating step to purge the slots 5 and 6 by closing the valve 62 and allowing air alone to flow through the masses 1 and 2 as this carries heat previously stored in the mass 2 over into the mass 1 and cools the mass 2. Very little of this heat is carried through the mass 1 and lost through the stack pipe 44. The hot air acts to burn out any carbon deposits in the upper portion of the slots 6, the inner surface of the walls of the space 11 and in the slots 5 and redistributes the heat to prepare for the following cracking step. It also cools the lower portion of the mass 2 so that it can cool the off-gas. In some furnaces the purging step may be omitted. The heating step is stopped by closing the valves 56, 58, 62 and 45 and the cycle is then completed. The next cycle starts with another cracking step as previously described.

It is, of course, understood that pyrometers are provided at strategic locations in the furnace, for example, at the top and bottom of each of the masses 1 and 2 in the upper space 11 and in the lower spaces 9 and 10. It is, of course, understood that all the valves, or at least those operating during the cracking and heating steps, may be power operated and controlled by a suitable timing mechanism, not shown. Flowmeters and means for controlling the flow of gas are also placed at various points in the gas flow.

The selection of a suitable acetylene forming hydrocarbon depends almost entirely on what hydrocarbons are available at the plant site. Obviously, the cheapest suitable acetylene forming hydrocarbon that is available is selected. In many localities natural gas is available at low cost and where natural gas is not available, butane and propane may be shipped in by tank car. Preference is, of course, given to hydrocarbons that are gaseous at atmospheric temperatures and pressures but petroleum distillates may be used if they are gasified by heating to a temperature of 250° F. before being delivered to the pipe 53.

The diluent supplied through the valve 52 is used to reduce the partial pressure on the acetylene forming hydrocarbon in the in-gas and within any limits of which I am aware the lower this partial pressure the better the process operates. Steam has commonly been used as a diluent but a gas that is entirely unaffected by the process, for example, hydrogen or nitrogen may be used. Waste combustion gases containing nitrogen, steam, and carbon dioxide may be used. For example, the gases from the stack pipe 44 may be delivered to an accumulator and delivered to the pipe 51 for use as a diluent. Probably dry steam is the most satisfactory of diluents. Dilutions up to four parts of diluent to one of a suitable hydrocarbon have been used.

As an example of the results that have been obtained from the process, it may be stated that if the in-gas contains one part of propane to four parts of steam, by volume, the off-gas produces a gas having the following volumetric characteristics:

|  | Percent |
|---|---|
| Carbon dioxide | 1.6 |
| Acetylene | 11.8 |
| Ethylene | 2.2 |
| Methane | 11.6 |
| Carbon monoxide | 14.4 |
| Hydrogen | 58.5 |

It is, however, essential that the following conditions be maintained during the operation of the process:

(a) The in-gas delivered to the lower space 9 must contain an operative proportion of an acetylene forming hydrocarbon.

(b) Some portion of masses 1 and 2 must be above the reaction temperature during the cracking step.

(c) Some portion of the masses 1 and 2 must be above the ignition temperature during the heating step.

(d) At no time should the temperature of any gas in the lower space 10 be much in excess of 500° F.

(e) The velocity of the in-gas during the cracking step should be sufficiently high to carry some reactable constituents of the in-gas through the reaction zone while still in reactable condition.

(f) The normal velocity of the combustible mixture through the slots 6 of the second mass during the heating step must be sufficiently high to prevent substantial flame propagation in a direction counter-current to the direction of gas flow.

It is a further object of my invention to provide a process in which the above conditions (a) to (f) inclusive may be maintained.

If the above necessary conditions are maintained, a person skilled in the art should be able to build and use the apparatus to economically produce acetylene.

As to the construction of the furnace, the regenerative masses 1 and 2 should be each about eight feet in length in the direction of gas flow. If Carborundum is used in the construction of the masses, the slots should be about $\frac{3}{16}$ inch wide. Wider slots cut down the efficiency of heat exchange and narrow slots are hard to construct and maintain in a brick structure. The horizontal area of the masses 1 and 2 is a direct function of the capacity of furnace desired. In a furnace having a capacity of 3000 lbs. of acetylene per hour, a total area of each mass of about 16 square feet will be satisfactory and, if Carborundum is used, the total horizontal area of all the slots should preferably be about 25% of the total area of the mass.

Substantial deviations from the above suggested construction will be automatically compensated for by the operation of the process if the necessary conditions of operation (a) to (f) are maintained by the operator. Operating conditions will vary with different designs and sizes of furnace, and when different acetylene forming hydrocarbons are used. The operator must adjust the timing of the cycle and the rates of flow in these furnaces, as in all furnaces, to obtain maximum yields. If all the carbon in 1000 cu. ft. of the hydrocarbon were utilized to form acetylene and was found in the acetylene delivered through the valve 23, the process would have 100% carbon efficiency. Such an efficiency is, of course, not possible as the off-gas will contain some small amounts of free carbon, carbon monoxide, and carbon dioxide. It will also contain a small amount of the acetylene forming hydrocarbon and other hydrocarbons, such as ethylene, which may be formed in the reaction. Nearly all of these by-products have some commercial value either taken alone or as a fuel gas so that the carbon efficiency is not a true measure of the commercial value of the process. However, carbon efficiencies as high as 40% have been obtained by my process, that is, as much as 200 cu. ft. or 13½ lbs. of acetylene have been obtained from 1000 ft. of natural gas. Since natural gas can now be bought in bulk at about 10¢ per thousand, and acetylene cannot be made from carbide at much less than $1.00 per 100 cu. ft., the over-all value of the process should be obvious.

I claim as my invention:

1. In a cyclic process for the thermal conversion of an in-gas containing a normally gaseous hydrocarbon, which can be pyrolized to produce a cracked off-gas containing an operative proportion of acetylene, said process consisting of alternating recurrent cracking and heating steps carried out in an apparatus comprising first and second channeled regenerative zones communicating through a chamber connecting adjacent ends of the zones, the channels of said zones being unobstructed straight passageways, an improved combination of cracking and heating steps, said cracking step comprising passing an in-gas substantially devoid of molecular oxygen through the substantially unobstructed passageways of the first regenerative zone from the end thereof opposite the chamber-connected end toward the chamber-connected end, the chamber-connected end being at a temperature which is above and the opposite end being at a temperature below the temperature at which the hydrocarbon reacts to form acetylene, withdrawing resulting heated gas from the passageways of the first zone at the chamber-connected end thereof and immediately and without delay conducting the heated gas emerging from the first zone directly through the chamber and into the passageways of the second regenerative zone at the chamber-connected end thereof, passing the gas through the substantially unobstructed passageways in the second regenerative zone, the end of the second regenerative zone opposite its chamber-connected end being at a temperature below about 500° F. and the chamber-connected end of said second regenerative zone being at a temperature substantially higher than the average temperature of said second regenerative zone and withdrawing a relatively cool off-gas from the lower temperature end of the second regenerative zone, said heating step comprising cooling the second regenerative zone and heating the first regenerative zone by flowing a combustible mixture through the passageways of the second regenerative zone from the cooler end thereof to the chamber-connected end, thereby cooling the second regenerative zone and heating the mixture to above its ignition point to cause combustion with the formation of hot combustion products from the mixture, passing the hot combustion products directly through the chamber and through the passageways of the first regenerative zone, and shutting off the supply of the combustible component of the mixture at the end of the heating step and continuing the supply of the balance of the combustible mixture, thereby re-establishing the temperature conditions prevailing at the beginning of the cracking step.

2. The process of claim 1 in which the in-gas is held at reaction temperature for not more than 0.03 second.

3. In a cyclic process for the thermal conversion of an in-gas containing a normally gaseous hydrocarbon, which can be pyrolized to produce a cracked off-gas containing a substantial amount of acetylene, said process consisting of alternating recurrent cracking and heating steps carried out in an apparatus comprising first and second channeled regenerative zones communicating through a chamber connecting adjacent ends of the zones, the channels of said zones being unobstructed straight slots, an improved combination of cracking and heating steps, said cracking step comprising passing an in-gas substantially devoid of molecular oxygen through the substantially unobstructed slots in the first regenerative zone from the end thereof opposite the chamber-connected end toward the chamber-connected end, the chamber-connected end being at a temperature which is above and the opposite end being at a temperature below the temperature at which the hydrocarbon reacts to form acetylene, withdrawing resulting heated gas from the slots of the first zone at the chamber-connected end thereof and immediately and without delay conducting the heated gas emerging from the first zone directly through the chamber and into the slots of the second zone at the chamber-connected end thereof, passing the gas through the substantially unobstructed slots in the second regenerative zone, the end of the second regenerative zone opposite its chamber-connected end being at a temperature below about 500° F. and the chamber-connected end of said second regenerative zone being at a temperature substantially higher than the average temperature of said second regenerative zone and withdrawing a relatively cool off-gas from the lower temperature end of the second regenerative zone, said heating step comprising cooling the second regenerative zone and heating the first regenerative zone by flowing a combustible mixture through the slots of the second regenerative zone from the cooler end thereof to the chamber-connected end, thereby cooling the second regenerative zone and heating the mixture to above its ignition point and causing combustion with the formation of hot combustion products from the mixture, passing the hot combustion products directly through the chamber and through the slots in the first regenerative zone, and shutting off the supply of the combustible component of the mixture at the end of the heating step and continuing the supply of the balance of the combustible mixture, thereby re-establishing the temperature conditions prevailing at the beginning of the cracking step.

4. The process of claim 3 in which the normally gaseous hydrocarbon is diluted with steam.

5. The process of claim 4 in which the normally gaseous hydrocarbon is propane.

6. The process of claim 5 in which the propane is diluted with steam in the proportion of one part of propane to four parts of steam by volume.

References Cited in the file of this patent

UNITED STATES PATENTS

| | | |
|---|---|---|
| 2,030,070 | Morrell | Feb. 11, 1936 |
| 2,113,536 | Grebe et al. | Apr. 5, 1938 |
| 2,133,496 | Winkler et al. | Oct. 18, 1938 |
| 2,160,170 | Martin et al. | May 30, 1939 |
| 2,208,123 | Duncan | July 16, 1940 |
| 2,319,679 | Hasche et al. | May 18, 1943 |

FOREIGN PATENTS

| | | |
|---|---|---|
| 390,849 | Great Britain | Apr. 5, 1933 |
| 578,311 | Germany | June 12, 1933 |
| 583,851 | Germany | Aug. 24, 1933 |